(12) United States Patent
Weissman et al.

(10) Patent No.: US 7,765,543 B1
(45) Date of Patent: Jul. 27, 2010

(54) SELECTIVE DESCHEDULING OF IDLING GUESTS RUNNING ON A HOST COMPUTER SYSTEM

(75) Inventors: Boris Weissman, Mountain View, CA (US); Dmitriy Budko, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 1150 days.

(21) Appl. No.: 10/871,922

(22) Filed: Jun. 18, 2004

Related U.S. Application Data

(60) Provisional application No. 60/530,717, filed on Dec. 17, 2003.

(51) Int. Cl.
*G06F 9/455* (2006.01)
*G06F 9/46* (2006.01)
*G06F 11/00* (2006.01)

(52) U.S. Cl. ............................. 718/1; 718/100; 714/48
(58) Field of Classification Search .................... 718/1, 718/102, 104, 105, 107, 108, 100; 714/48
See application file for complete search history.

(56) References Cited

U.S. PATENT DOCUMENTS

| | | | | | |
|---|---|---|---|---|---|
| 4,912,628 A | * | 3/1990 | Briggs | ......................... | 718/100 |
| 4,949,254 A | * | 8/1990 | Shorter | ....................... | 718/106 |
| 5,072,376 A | * | 12/1991 | Ellsworth | .................... | 718/105 |
| 5,416,726 A | * | 5/1995 | Garcia-Duarte et al. | ...... | 713/300 |
| 5,530,860 A | * | 6/1996 | Matsuura | .................... | 718/105 |
| 5,845,138 A | * | 12/1998 | Nowlin, Jr. | ................... | 713/323 |
| 6,065,046 A | * | 5/2000 | Feinberg et al. | .............. | 709/216 |
| 6,075,938 A | * | 6/2000 | Bugnion et al. | ................ | 703/27 |
| 6,223,202 B1 | * | 4/2001 | Bayeh | ......................... | 718/102 |
| 6,269,043 B1 | * | 7/2001 | Batcher | ....................... | 365/227 |
| 6,397,242 B1 | * | 5/2002 | Devine et al. | ................... | 718/1 |
| 6,442,652 B1 | * | 8/2002 | Laboy et al. | ................. | 711/138 |
| 6,496,847 B1 | * | 12/2002 | Bugnion et al. | ................ | 718/1 |
| 7,379,422 B2 | * | 5/2008 | Nation | ..................... | 370/230.1 |
| 7,383,368 B2 | * | 6/2008 | Schopp | ........................ | 710/200 |
| 2003/0037089 A1 | * | 2/2003 | Cota-Robles et al. | ........... | 709/1 |
| 2003/0041090 A1 | * | 2/2003 | Armstrong et al. | ........... | 709/106 |
| 2003/0055864 A1 | * | 3/2003 | Armstrong et al. | ........... | 709/107 |

OTHER PUBLICATIONS

Whitaker et al., "Denali: a scalable isolation kernel", ACM, 2002, pp. 1-6.*
Shaw et al., "Denali: light weight virtual machines for distributed and networked applications", the university of Washington, 2002, pp. 1-14.*
Waldspurger, "Memory resource management in VMware ESX server", VMware, 2002, pp. 1-14.*
Sugerman et al., "Virtualizing I/O devices on VMware workstation's hosted virtual machine monitor", VMware, 2001, pp. 1-14.*

(Continued)

*Primary Examiner*—Meng-Ai An
*Assistant Examiner*—Caroline Arcos
(74) *Attorney, Agent, or Firm*—Jeff Pearce

(57) ABSTRACT

Guests, such as virtual machines, that are running on a host hardware platform are selectively descheduled when an idling condition is detected. An example of the idling condition is that the guest has been executing instructions in an idle loop for more than a threshold period. Guest instructions may be evaluated for the idling condition in conjunction with binary translation.

27 Claims, 3 Drawing Sheets

OTHER PUBLICATIONS

Microsoft Computer Dictionary, Fifth Edition, p. 1, Retrived on Mar. 12, 2009 From http://proquest.safaribooksonline.com.*

Ravi Rajwar, et al., "Speculative Lock Elision: Enabling Highly Concurrent Multithreaded Execution," IEEE Xplore, 2001, pp. 294-305.

"Intel Architecture Software Developer's Manual," vol. 2 Instruction Set Reference, Order No. 23191, (2 pages).

X8 Instruction Set Reference, HLT, Halt http://siyobik.info/index.php?module=x86&id=134.

X8 Instruction Set Reference, PAUSE, Spin Loop Hint http://siyobik.info/index.php?module=x86&id=232.

Ravi Rajwar et al., "Speculative Lock Elision: Enabling Highly Concurrent Multithreaded Execution," IEEE Xplore, 2001, pp. 294-305.

"Intel Architecture Software Developer's Manual," vol. 2: Instruction Set Reference, Order No. 23191, 1999, 2 pages.

X86 Instruction Set Reference, HLT, Halt, printed Dec. 8, 2008, (1 page). http://siyobik.info/index.php?module=x86&id=134.

X86 Instruction Set Reference, PAUSE, Spin Loop Hint, printed Dec. 8, 2008, (1 page). http://siyobik.info/index.php?module=x86&id=232.

* cited by examiner

SELECTIVE DESCHEDULING OF IDLING GUESTS RUNNING ON A HOST COMPUTER SYSTEM

CROSS-REFERENCE TO RELATED APPLICATIONS

This application claims priority of U.S. Provisional Patent Application No. 60/530,717, filed 17 Dec. 2003.

BACKGROUND OF THE INVENTION

1. Field of the Invention

This invention relates to task scheduling mechanisms in system-level computer software, especially in the context of virtualized computer systems.

2. Background Art

The advantages of virtual machine (VM) technology have become widely recognized. Among these advantages is the ability to run multiple virtual machines as "guests" on a single "host" platform. This makes better use of the capacity of the hardware, while still ensuring that each user enjoys the features of a "complete," isolated computer. Depending on how it is implemented, virtualization also provides greater security since it can isolate potentially unstable or unsafe software so that it cannot adversely affect the hardware state or system files. This and other advantages are also provided by virtualization even in systems with only a single virtual machine. Computer virtualization is described in greater detail below.

A disadvantage of running multiple VMs on a single platform is that the problems faced by single machines—virtual or physical—are also multiplied, especially since the code defining all processes must eventually be executed on the same physical processor(s). One such problem is that each VM includes at least one, and possible several, virtualized processors, each of which may spend significant time idling.

Modern operating systems generally place idle processors into a tight loop that continuously checks for the presence of new tasks by examining a runnable queue, which contains a list of tasks or processes that can be dispatched by the idle processors. Idle processors may potentially spend prolonged time periods "spinning" in such idle loops when the system load is light. This is common for operating systems executing directly on the underlying hardware as well as for the guest operating systems executed inside a VM.

As mentioned above, in a virtualized computer system, there may be many VMs executing simultaneously on the same hardware platform. Each such VM may contain a guest operating system that spends a significant portion of its execution time in an idle loop. This scenario is particularly common for contexts where virtualization is used to consolidate multiple lightly loaded physical servers into a single server running multiple VMs: The consolidation is performed precisely because the system load for each individual server is not sufficient to warrant a separate physical machine. In such environments it is imperative that the virtualization infrastructure be capable of making intelligent scheduling decisions across VMs—VMs that have runnable tasks to perform must be preferentially scheduled on physical hardware relative to the VMs spinning in idle loops. Ideally, a VM in an idle loop should consume as little of the physical resources as possible and should be scheduled only when it is ready to exit the idle loop and perform useful work.

Multiprocessor VMs make the potential spinning problem worse. A single idle VM may have multiple virtual CPUs spinning in respective idle loops and consuming resources of multiple physical processors. Indeed, a single idle VM with sufficiently many virtual processors may potentially starve all other VMs even on a large multiprocessor system.

While intelligent scheduling of idle VMs is necessary for maximizing the overall throughput of virtualization systems, it is hard to accomplish in a fashion transparent to the guests. In particular, it is hard to determine which VMs are executing in their respective idle loops. VMs may, for example, be running different guest operating systems (Windows, Linux, Solaris, etc.) with different service packs or patches installed.

One way to accomplish this is to export special application program interfaces (APIs) to the VMs' guest operating systems to signal the virtualization environment when the guest is entering or leaving its idle loop. However this would violate the goal of transparency—the guest operating systems would need to be modified in order to perform well inside such a virtualization environment. It is desirable to achieve the performance goal even where the guest operating system is an unmodified, stock operating system.

Intel Corp. has recognized the impact of spinning on system performance and has introduced certain hardware mechanisms in order to reduce this impact in Intel Xeon and Pentium 4 processors. Intel Xeon and Pentium 4 chips currently account for the bulk of IA-32 compatible units shipped annually.

Intel recommends the use of a PAUSE instruction in all spin-wait loops that run on Intel Xeon and Pentium 4 processors. The spin-wait loops include operating system idle loops. Because the PAUSE instruction is treated as a "no-operation" NOP instruction in earlier IA-32 processor generations and does not require CPUID checks, it was quickly adapted by many operating systems (Windows 2000 family, Linux, FreeBSD, etc.). On physical hardware, the PAUSE instruction placed in a tight polling loop provides the following benefits: 1) it provides a hint to the processor that the executed code sequence is a spin-wait loop in order to avoid a memory order violation and to prevent the pipeline flush; 2) it frees up execution resources that may be used by other logical threads if the processor supports hyper-threading; and 3) it reduces the power consumption by the processor.

The disadvantage of using spin loops in the context of multiple VMs, even in the presence of the PAUSE instruction, is that an idle VM will continue to consume processor resources while starving other VMs: An idle VM will continue to spin (with reduced power consumption, etc.) until the VM's scheduling quantum expires, at which point the VM is descheduled and another VM is scheduled in its place. Fully idle VMs will spend their entire scheduled quanta spinning in the idle loop, preventing other VMs from executing runnable tasks. The use of the PAUSE instruction in itself does not solve the problem of scheduling idle VMs in multi-VM environments.

Intel also recommends explicitly halting a processor by means of the HLT instruction if it remains in a spin-wait loop for a long time. Excessive transitions into and out of the halt state could, however, incur performance penalties and operating systems are advised to evaluate performance trade-offs for their specific contexts before halting. In many instances, the idle loop may eventually halt the processor via HLT, but only after spending a substantial time in the spin-wait idle loop based on the PAUSE instruction.

Still another Intel recommendation is that spin-wait loops be based on the following example, which implements a "test, test-and-set" algorithm (expressed here using standard Intel instruction abbreviations):

```
Spin Lock:
    CMP lockvar, 0          ; Check if lock is free
    JE Get_Lock
    PAUSE                   ; Short Delay
    JMP Spin_Lock
Get_Lock:
    MOV EAX, 1
    XCHG EAX, lockvar       ; Try to get lock
    CMP EAX, 0              ; Test if successful
    JNE Spin_Lock
Critical_Section:
    <critical section code>
    MOV lockvar, 0
    ...
Continue:
```

The disadvantage of using such a spin-wait loop in multi-VM environments is the same as when using any other spin-loop based solutions: An idle VM will continue spinning and using processor cycles that could be used by other VMs with runnable tasks.

What is needed is therefore a way to reduce the waste of the physical processor resource associated with existing mechanisms for scheduling multiple idling processes and that is suited for providing more efficient allocation of the processor resources in the case of virtualized multi-processor systems. This invention provides a way to do this.

SUMMARY OF THE INVENTION

In a computer system that includes a host hardware platform, which in turn includes at least one processor, and at least one guest system running on the host platform by issuing guest instructions for execution on the processor(s), the invention provides a scheduling method in which an idling condition is detected in the guest system, which is then descheduled.

The idling condition can be defined in various ways, but will in general include the execution of at least one guest instruction indicating idling. Examples of the idling condition include the execution of an idling loop, either at all or for longer than a threshold period, which may optionally be made adjustable and/or as a function of workload on at least one hardware processor.

In conjunction with sensing of at least one instruction pointer range in which executing guest instructions lie, the idling condition may alternatively be the execution by the guest system within the range(s) for longer than a threshold period. Optionally, this may include sampling the guest instructions such that only a subset of the guest instructions' pointer range(s) is sensed and evaluated relative to the idling condition.

Pattern-matching guest instructions can also be used to detect idling, in which case the idling condition is the occurrence of a sequence of guest instructions that matches an idling pattern.

The software components that perform the steps for detecting idling and then for descheduling an idling guest may be located in different software layers or larger components. For example, in a preferred embodiment of the invention, a system software layer is included functionally between the guest system and the host hardware platform and the scheduling software module is incorporated into this layer.

The detection software module is advantageously incorporated into a binary translator, which converts at least some of the guest instructions into respective translated instruction streams for execution on the host processor(s). The binary translator may then emit a descheduling code block as the translated instruction stream for at least one instruction in the idling loop indicative of idling. Execution of the descheduling code block then performs the steps of detecting the idling condition, indicating descheduling, and indicating rescheduling and resumption of execution of the guest instruction stream.

The invention is well suited for selective descheduling in virtualized computer systems in which at least one of the guest systems is a virtual machine, with its own virtual processor(s) and guest operating system. In this case, the detection software module may be located in an underlying system-level kernel, or in an interface layer such as a virtual machine monitor or hypervisor on which the virtual machine runs, or even wholly or partially within the guest operating system itself (for example, for para-virtualized computer systems).

DETAILED DESCRIPTION

Introduction

Figure 1:
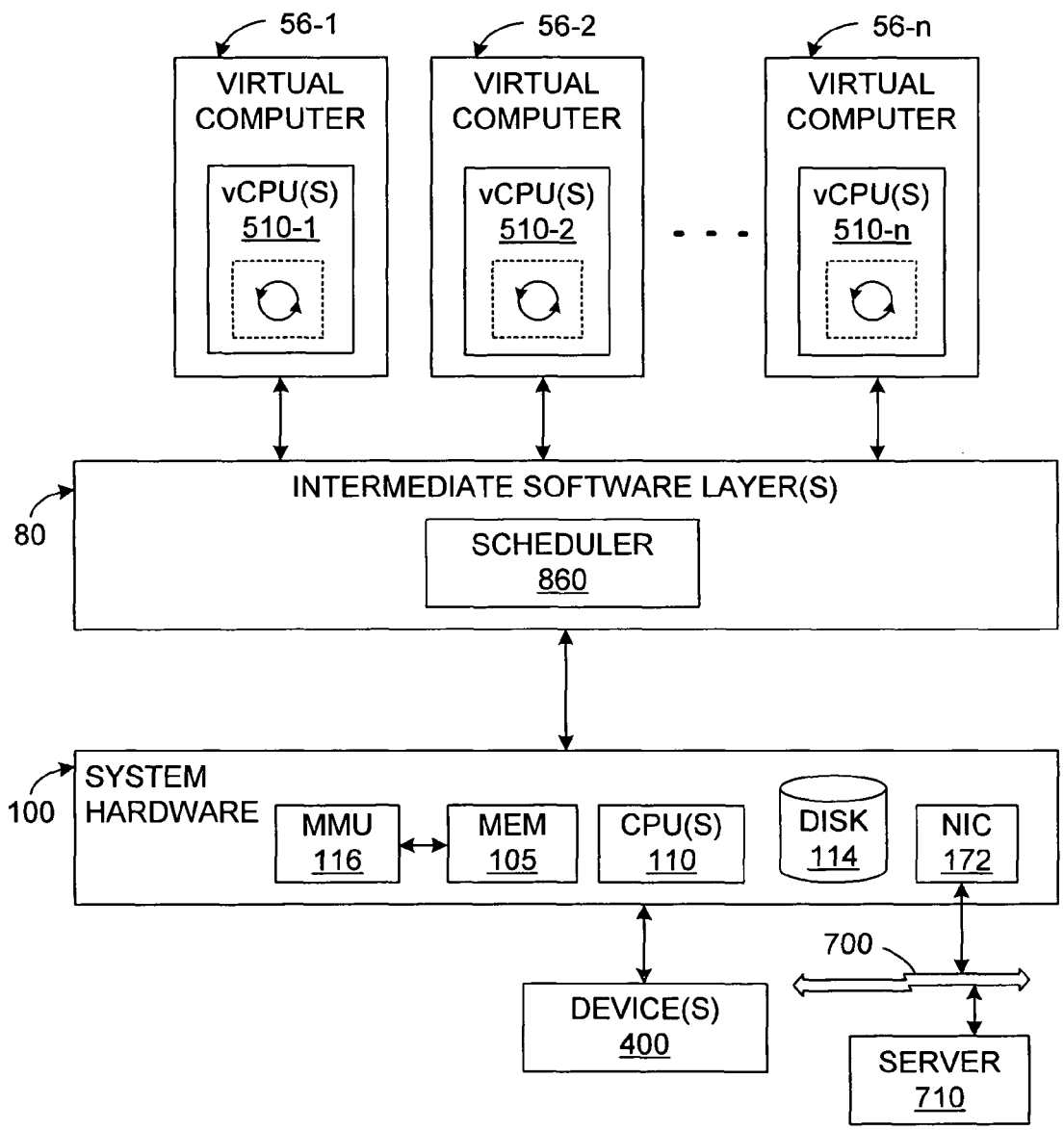
FIG. 1 illustrates the main software and hardware components of a system of virtual computers that incorporates the invention.

This invention provides a software mechanism that efficiently exploits the structure of idle loops of modern operating systems so as to deschedule idling guest systems that are running on a common hardware platform or are otherwise sharing CPU or other hardware resources. The invention is particularly advantageous in the context of virtualized computer systems and it is applicable not only to a wide range of modern stock single- and multi-processor guest operating systems, but also to guest operating systems customized for virtualization. Before delving into the specifics of the invention, the general structure of a virtualized computer system is described by way of example General System Configuration FIG. 1 illustrates one example of a system in which the invention may be incorporated. A system hardware platform 100 includes one or more processors (CPUs) 110, system memory 105, and at least one storage device, which will typically be a disk 114. The system memory 105 will typically be some form of high-speed RAM, whereas the disk (one or more) will typically be a non-volatile ("persistent") mass storage device. The hardware 100 will usually also include other conventional mechanisms such as at least one memory management unit MMU 116 (for example, one per processor), and often one or more conventional network connection device(s) 172 (such as a network adapter or network interface card—"NIC") for transfer of data between the various components of the system and one or more external systems such as servers 710 via a bus or network 700.

At least one intermediate system software layer 80 includes, or is, a host operating system, or some software that performs the hardware-interface, resource-allocating and control functions of an operating system. The operating system will usually also be loaded or bundled with drivers as needed for various connected devices, both "internal," such as the disk 114 and NIC 172 and "external" devices 400 such as a keyboard, mouse, trackball, touchpad, printer, etc. The general components of an operating system are well known and are therefore not discussed here further.

One or more guest(s) 56-1, 56-2, ..., 56-*n* run on the hardware 100 via (or as part of) the system software layer 80. As used in here, a "guest" is any software entity (for example, a traditional OS process, a virtual machine, etc.) that is defined by and directly or indirectly issues (for example, after retrieval from memory) computer-executable code that is to execute on any processor 110. The guests will typically (but not necessarily) be user-level applications in that at least some of their requests for system resources (including access to the memory 105 and disk 114) are mediated by the host operating system or similar intermediate software or, indeed, by firmware or hardware that performs the necessary functions. In most systems, the guests are "applications." In implementations in which the invention is included in a virtualized computer system (see below), one or more of the guests may be a virtual computer, which of course may also be considered an application, albeit a very special one. An example of a virtualized computer system is described below.

In most common computer systems, the code that defines and is issued by the guest is part of the architected instruction set of the processor(s) 110 that are to execute it. This is not always so, however. Rather, guests may also issue code that is either wholly or partially from a different instruction set, for example, in cross-architectural virtualized systems, or that for some other reason is not to execute directly on the underlying hardware processor(s), for example, because it has or is deliberately set to an insufficient privilege level. In these cases, the guest code may then be converted into a form suitable for running on the hardware processors; one conversion method, which is described further below, is "binary translation."

Virtualized Embodiments

As is well known in the field of computer science, a virtual machine (VM) is a software abstraction—a "virtualization"—of an actual physical computer system. In virtualized embodiments of the invention, each VM 500 constitutes one of the guest systems 56-1, 56-2, ..., 56-*n* shown in FIG. 1. Only one VM 500 is shown in FIG. 2 because of space limitations and to better illustrate its internal components, which will generally be the same or analogous from one VM to another.

Figure 2:
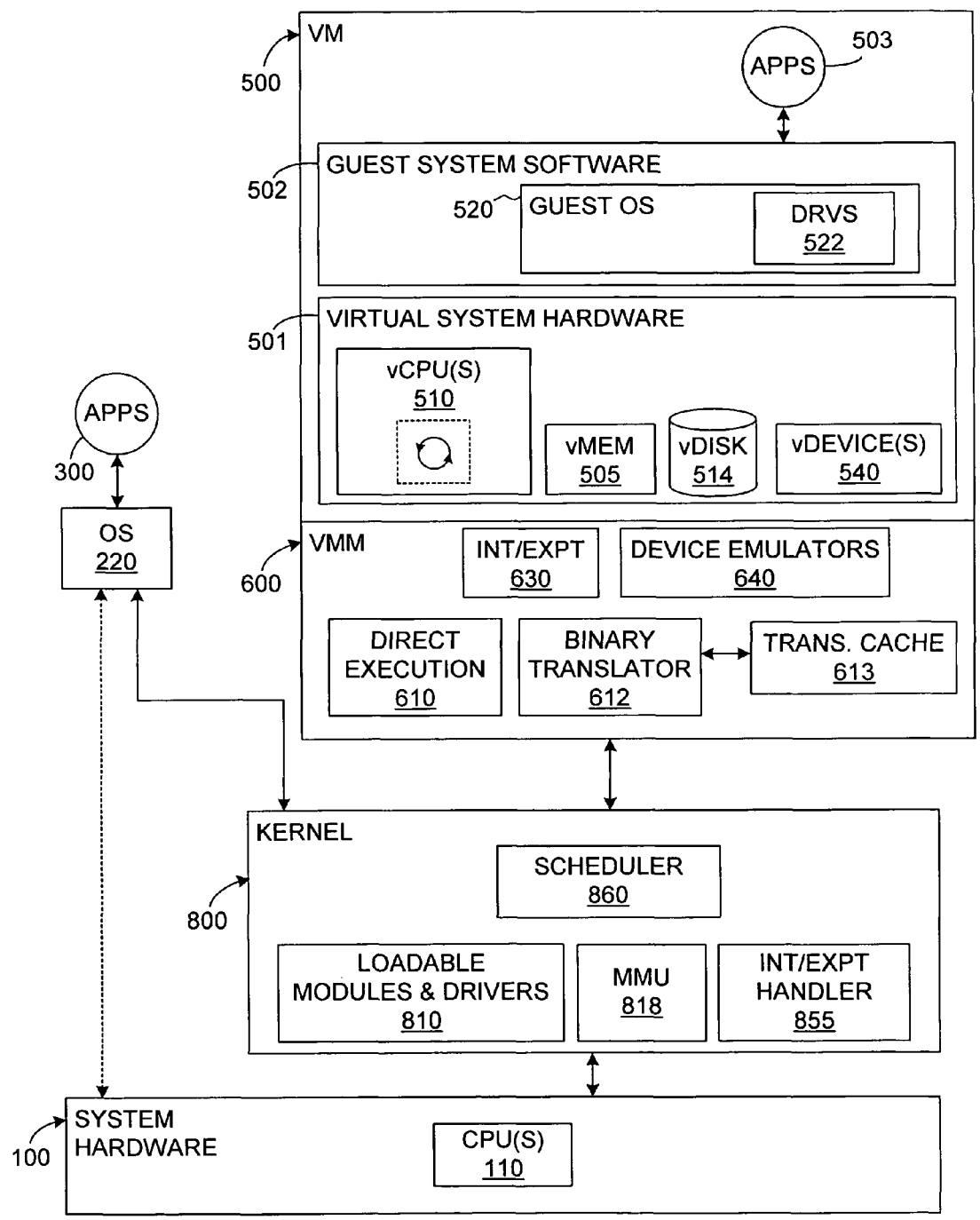
FIG. 2 illustrates in greater detail the various software components found within a typical virtual computer and intermediate software layer in the system configuration shown in FIG. 1.

Two configurations are in general use—a "hosted" configuration in which a general-purpose operating system forms a host OS that is used to perform certain I/O operations; and a non-hosted configuration, illustrated in FIG. 2, in which a kernel 800 customized to support virtual computers takes the place of the conventional operating system. This invention works with either configuration, as well as with so-called "para-virtualized" systems (see below).

Each VM 500 will have (or interface with) both virtualized, guest system hardware 501 and guest system software 502. The virtualized, guest system hardware typically includes at least one virtual CPU 510, guest memory 505, at least one virtual disk 514, and one or more virtualized devices 540. Note that a disk—virtual or physical—is also a "device," but is usually considered separately because of its important role in almost all virtualized systems. All of the virtual hardware components of the VM may be implemented in software as computer-executable code using known techniques to emulate the corresponding physical components. The guest system software 502 includes a guest operating system 520 (which may simply be a copy of a conventional operating system), and drivers 522 as needed for the various virtual devices 540.

Of relevance to this invention is that the virtualized hardware, in particular, the virtual CPU(s), and/or guest system software, will also include the same (or analogous) idling mechanisms as are found in a "real," that is, physical, computer.

If the VM is properly designed as a fully virtualized system, then even though applications 503 running within the VM are running indirectly, that is, via the guest OS 520 and virtual processor(s) 510, they will act just as they would if run on a "real" computer, except for a decrease in running speed that will be noticeable only in exceptionally time-critical applications. Executable files will be accessed by the guest OS 520 from the virtual disk 514 or virtual memory 505, which will simply be portions of the actual physical disk or memory allocated by the host to that VM. Once an application 503 is installed within the VM, the guest OS 520 retrieves files from the virtual disk just as if they had been pre-stored as the result of a conventional installation of the application. The design and operation of virtual machines are well known in the field of computer science.

Some interface is usually required between a VM and the underlying host platform 100 (in particular, the CPU 110), which is responsible for actually executing VM-issued instructions and transferring data to and from the actual memory 105 and storage devices 114. A common term for a widely used form of this interface is a "virtual machine monitor" (VMM), shown in FIG. 2 as component 600. A VMM is usually a software layer that runs directly on top of a host, or directly on the hardware, and virtualizes at least some of the resources of the physical host machine, or at least of some physical machine. The interface exported to the VM 500 is then the same as the hardware interface of the machine (or at least of some machine). In fully virtualized systems, the guest OS 520 may often be an unmodified, off-the-shelf commercial operating generally, which then will generally not even be aware of the presence of the VMM.

The invention may be used, however, even in "para-virtualized" systems, in which the guest OS 520 is aware that it is being virtualized, and has an explicit interface to the VMM. In such systems (and, indeed, even in some fully virtualized systems), the VMM is sometimes referred to as a "hypervisor." Moreover, other systems have been proposed in which the guest OS 520 is specifically modified to directly access the actual system hardware; in such systems, either a VMM or related software component is not included at all, or is bypassed in some situations. The invention may be used in all such systems.

The VMM 600 also usually tracks and either forwards (to some form of operating system) or itself schedules and handles requests by its VM for machine resources, as well as various faults and interrupts. An interrupt handling mechanism 630 is therefore usually included in the VMM.

Although the VM may be configured to be a more or less self-contained software entity, the VMM and the VM may be viewed as together forming a single virtual computer. Moreover, the various virtualized hardware components such as the virtual CPU(s) 510, the guest memory 505, the virtual disk 514, and the virtual device(s) 540 are shown and referred to as being part of the VM 500 for the sake of conceptual simplicity—in actual implementations these "components" are usually software constructs or emulations exposed to the VM by the VMM, for example, as emulators 640. One advantage of such an arrangement is that the VMM may be set up to expose "generic" devices, which facilitate VM migration and hardware platform-independence. The VM and VMM are shown in the figures as separate components for the sake of clarity.

In most implementations of the invention in virtualized computer systems, there will be more than one VM/VMM pair (virtual computer) or other guests running on a common host; a single VM/VMM pair is shown in FIG. 2 for simplicity. As will become clearer from the description of the invention below, the invention does not require that all—indeed, any—entities being selectively and temporarily descheduled are VMs; rather, the invention may be used to selectively deschedule any idling processes sharing the hardware platform, including where one or more of these processes is a VM.

In considering the description of the invention below, one should keep in mind that the state of the virtual hardware components and of the data structures defining the VM are generally observable and usually even controllable by the VMM, or by whatever interface software layer(s) performs the functions normally associated with a VMM. In particular, whenever a virtual CPU or, equivalently, the guest OS is idling, this state will be observable to the VMM or an analogous software component interposed between the VM and the hardware processor(s). Moreover, the VMM can usually also control which interrupts are exposed to the virtual processor(s) 510.

Hosted Virtual Computers

In a hosted virtual computer system, such as is used in the Workstation product of VMware, Inc., of Palo Alto, Calif., the VMM 600 is co-resident at system level with the host operating system such that both the VMM and the host OS can independently modify the state of the host processor. However, the VMM calls into the host OS via a special driver and a dedicated user-level application to have the host OS perform certain I/O operations on behalf of the VM. The virtual computer in that configuration is thus hosted in that it runs on the existing host hardware platform 100 together with an existing host OS. A hosted virtualization system of this type is described in U.S. Pat. No. 6,496,847 (Bugnion, et al., "System and Method for Virtualizing Computer Systems," 17 Dec. 2002), which is incorporated here by reference.

Non-Hosted Virtual Computers

FIG. 2 illustrates a "non-hosted" virtualized computer system, in which a dedicated kernel 800 takes the place of and performs the conventional functions of the host OS, and virtual computers run on the kernel. The kernel 800 then serves as the system software for the VM/VMM pairs. Compared with a system in which VMMs run directly on the hardware platform 100, use of a kernel offers improved performance because it can be co-developed with the VMMs and be optimized for the characteristics of a workload consisting of VMMs and their respective VMs. Moreover, a kernel can also be optimized for I/O operations and it facilitates provision of services that extend across multiple VMs (for example, for resource management). The ESX Server product of VMware, Inc., has such a configuration.

At boot-up time, an existing operating system 220 may be at system level and the kernel 800 may not yet even be operational within the system. In such case, one of the functions of the OS 220 may be to make it possible to load the kernel 800, after which the kernel runs on the native hardware 100 and manages system resources using such components as various loadable modules and drivers 810, a memory management unit 818, at least one interrupt and exception handler 855, etc.

In effect, the kernel, once loaded, displaces the OS 220. Thus, the kernel 800 may be viewed either as displacing the OS 220 from the system level and taking this place itself, or as residing at a "sub-system level." When interposed between the OS 220 and the hardware 100, the kernel 800 essentially turns the OS 220 into an "application," which has access to system resources only when allowed by the kernel 800. The kernel then schedules the OS 220 as if it were any other component that needs to use system resources.

The OS 220 may also be included to allow applications 300 unrelated to virtualization to run; for example, a system administrator may need such applications to monitor the hardware 100 or to perform other administrative routines. The OS 220 may thus be viewed as a "console" OS or "service console." In such implementations, the kernel 800 preferably also includes a remote procedure call (RPC) mechanism and/or a shared memory area to enable communication, for example, between the VMM 600 and any applications 300 installed to run on the console OS 220.

The OS 220 kernel may usually be unmodified, or at most only slightly modified, in order to support either the hosted or non-hosted virtualized computers. In fact, at least in the virtualization products of VMware, Inc., "off-the-shelf" or only slightly modified commodity operating systems such as Linux and Microsoft Windows may be used as the host or console operating systems. In the ESX Server product of VMware, for example, the console OS is a modified Linux distribution.

Because the VMs and VMMs run on the kernel 800, one could of course say that the kernel is a "host." On the other hand, the kernel 800, such as in ESX Server, is more dedicated to and optimized for use in virtualized systems as opposed to being an unmodified or only slightly modified standard OS that is used primarily for other purposes. The term "non-hosted" is used here simply to indicate this distinction. It is to be understood, however, that the distinction could be blurred in a hosted system in which the host operating system (or, indeed, the hardware platform 100) is more extensively modified to support virtualization. This invention does not depend on a distinction between the concepts of a "hosted" versus a "non-hosted" architecture.

Binary Translation vs. Direct Execution

In systems that cannot, or choose not to, allow all guest code to execute on the underlying processor(s), some form of code conversion module is typically included in one of the intermediate software layers 80 to convert the guest code that is not native to the hardware processor(s) 110 into instructions that are. A well known form of conversion is known as "binary translation," in which case the code conversion module is known as a binary translator, which is shown as component 612 in FIG. 2, for example.

Using binary translation, a guest instruction—or instruction sequence—is converted into one or more instructions. In other words, the translation of a single guest instruction may produce any number of native instructions. Binary translation therefore often causes a drop in performance, but it has advantages as well. For example, the translation need not be "exact," meaning that it is also possible to insert into the translation instruction sequence code that performs other functions besides what the untranslated guest code itself specifies. One way to mitigate the decreased performance that binary translation typically causes is to avoid translating the same instruction or sequence more than once. Instead, the translation may be stored in a translation cache 613 for immediate recall the next time the instruction is encountered.

As is known, for example, from U.S. Pat. No. 6,397,242 (Devine, et al., 28 May 2002), which is incorporated here by reference, some virtualization systems allow VM instructions to run directly (in "direct execution" mode) on the hardware CPU(s) when possible. When necessary, however, VM execution is switched to binary translation, during which the VM is running in the VMM and the VM instructions are converted—translated—into a different instruction or instruction sequence, for example, to enable execution at a safe privilege level; if no emulation is needed, then original VM instructions may also be copied directly into a translation cache. The VMM 600 is therefore shown in FIG. 2 with a direct execution engine 610 in addition to the binary translator 612 and the translation cache 613, which holds the sequences of translated instructions; the VMM will generally also include these components in non-hosted systems.

In the hosted virtualization system described in U.S. Pat. No. 6,397,242, for the sake of speed, VM instructions are normally allowed to execute directly. The privilege level of the physical CPU is, however, set such that the hardware platform does not execute VM instructions that require a more privileged level than the VM is set at. Instead, attempted execution of such an instruction causes the platform to issue a fault, which the VMM handles in part by executing a software module that causes switching of VM execution to binary translation. Direct execution is then resumed at a safe point in the VM instruction stream. This dual-execution mode feature may be used in both hosted and non-hosted configurations of the virtualized computer system.

This invention does not depend on any ability to execute guest instructions directly, but rather operates primarily in the context of converted (for example, binary-translated) code. The invention is described in the context of binary translation, with a dedicated binary translator 612, by way of example, and because it is in this context that the invention is most likely to be applied.

Idling Detection and (De)Scheduling

In broadest terms, the invention provides a mechanism that detects when guest entity is idling, and it deschedules the entity if it has been idling too long. It can then again schedule the entity when appropriate.

By way of illustration only, it is assumed below that the guest is one of a plurality of virtual machines; that the guest entity is the guest operating system; and that idling is detected by examining, in a binary translator, one or more guest instructions. The embodiment of the invention described here as an example thus exploits the structure of idle loops of modern operating systems, especially for the IA-32 architecture, to detect when a guest operating system enters an idle loop in virtualization systems based on binary translation (BT). This solution allows detection of the idle condition without modifying the guest operating system and is applicable to a range of modern stock uni- and multi-processor guest operating systems.

As explained above, in BT-based systems, at least some of the guest instructions do not execute directly on the underlying hardware; instead, these instructions are passed through a binary translation layer (for example, the binary translator 612) that receives an incoming stream of guest instructions and generates an outgoing stream of instructions for subsequent execution by the physical processor(s) 110.

By way of example, assume that when the guest operating system is idling, it executes an idle loop that contains a characteristic instruction such as PAUSE. As noted above, each instruction that the guest OS 520 executes will be observable by the VMM 600 or equivalent intermediate software layer.

According to the invention, on observing the PAUSE instruction in the incoming guest instruction stream, the binary translator 612 emits a special code sequence to be executed on underlying hardware. This emitted code sequence implements the following code block:

```
if (spinning=FALSE) {
  /*
   * About to enter or re-enter the spin-wait loop.
   * Perform initialization.
   */
  spinning=TRUE;
  startTime=CurrentTime( );
} else {
  /*
   * In the middle of the Spinning Stage.
   * Check if there is a need to deschedule.
   */
  if     (CurrentTime(    )−startTime>SpinningInterval)
     {spinning=FALSE;
     Deschedule( ); /* yield the physical processor */
  } else {
     /*
      * The guest is still in the spinning stage.
      * Execute a hardware PAUSE instruction and continue.
      */
     PAUSE;
  }
}
/*
 * At this point, the guest is in one these states:
 * (1) Rescheduled after yielding the physical processor
 * (2) Still in the spinning stage.
 * Resume the execution of the translated code at the
 * instruction following PAUSE.
 */
ResumeExecutionAtEip(pauseEip+2); /* PAUSE is 2 byte
   instruction */
```

The essence of this code block is that a timer is started when the binary translator detects that the guest OS 520 is in an idle loop. If a threshold time period is exceeded, then the corresponding guest (VM) is descheduled.

Both startTime (the time at which the code block begins to time idling) and CurrentTime( ) (which returns wall clock time) can be measured using the existing clock circuitry or software modules of the system-level software or hardware platforms. One way to implement CurrentTime( ) would be to use a RDTSC instruction.

Since one of the functions of operating systems (including where the functions are performed by the kernel 800) is to schedule and deschedule processes, descheduling can be arranged by issuing an appropriate notification to a scheduler 860.

The code block illustrated above, which skilled programmers will be able to code using known methods, has two stages: 1) the initial Spinning Stage; and 2) the Descheduled Stage.

"SpinningInterval" controls the duration of the Spinning Stage and may be selected either statically or dynamically depending on the workload characteristics. In other words, the length of time the guest is allowed to spin before being descheduled may be either fixed or variable, depending on how busy the processor(s) are. The Spinning Stage handles short idle intervals where runnable tasks become available shortly after entering the idle loop. It improves the task dispatch latencies in such cases by keeping the control over the physical processor. While in the Spinning Stage, the code block executes a hardware PAUSE instruction and resumes the emulation of the guest idle loop at the instruction following the original guest PAUSE instruction. On the subsequent iteration of the idle loop, the above sequence is reentered and the steps are repeated.

Once the SpinningStage interval reaches SpinningInterval, the code block initiates a descheduling operation. Deschedule( ) indicates to the host scheduler 860 (or a VM scheduler for hostless systems) that the currently executed virtual processor is idling. The host scheduler 860 may then reuse the underlying physical processor to run a different VM, or some other task.

The Deschedule( ) operation may be implemented by several known mechanisms. For example, depending on the binary translation system architecture, Deschedule( ) could be implemented by executing a trapping privileged instruction that transfers control directly to the scheduler 860 in the kernel 800. Alternatively, descheduling might be triggered by calling into the kernel 800 directly from the binary translated code if it runs at a sufficiently high privilege level.

The host scheduler 860 deschedules the yielding virtual processor for a certain statically or dynamically sized interval. Whether the interval is fixed (and in such case for how long) or variable can be chosen using normal design methods. It is also possible to switch between a fixed and a variable intervals as a function of current workload, which can be evaluated using known methods.

On expiration of this interval, the virtual processor 510 is rescheduled at the instruction following Deschedule( ) in the above sequence. The emulation of the guest instructions by the binary translator 612 is then resumed at the instruction following the guest PAUSE instruction. In the illustrated IA-32 example, PAUSE is a two-byte instruction, so that the address at which execution is to resume will be the address of the PAUSE (pauseEip), as indicated in the instruction pointer (EIP), plus two; this will of course depend on the given architecture and can be easily modified accordingly.

If the guest is still idle, the next iteration of the idle loop will re-enter the above sequence in the Spinning Stage; otherwise, the guest has runnable tasks and one of them will be scheduled by the scheduler in the guest OS.

The parameters "startTime" and "spinning" may be cleared if the above sequence is not re-entered within a certain interval to avoid possible interference between separate incarnations of the idle loop.

Figure 3:
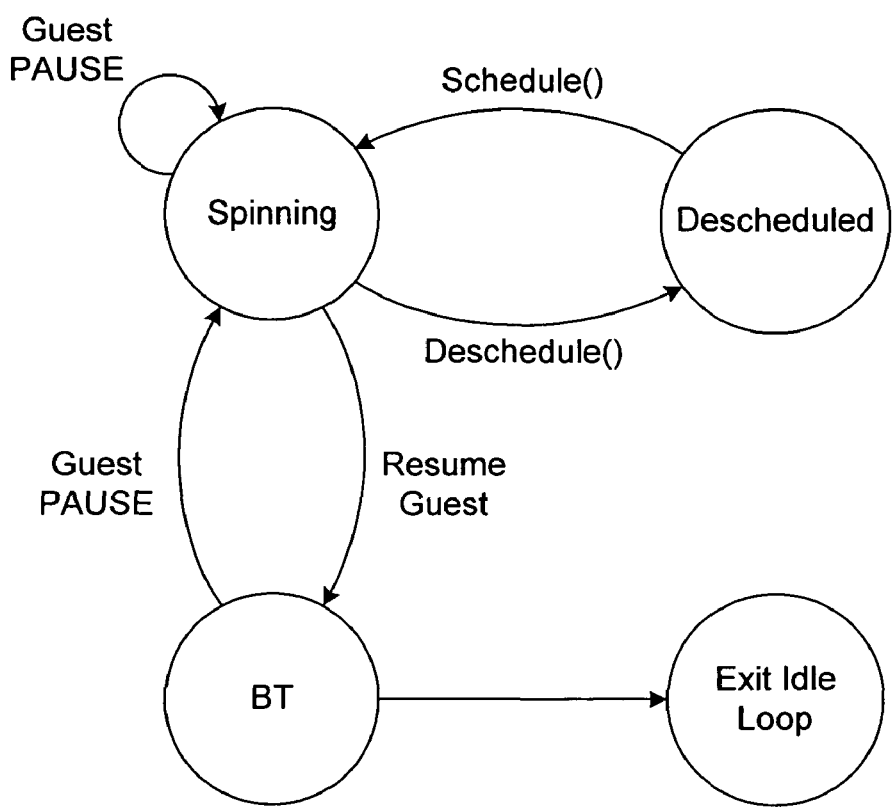
FIG. 3 illustrates state transitions implemented by the invention.

FIG. 3 illustrates the state transitions that the code block shown above implements.

Location and Separability

In FIG. 2, the scheduler 860 is shown as being a software module within the kernel 800, but it may be located in any software layer or component that is designed to handle scheduling tasks, including in the kernel of a conventional operating system. Schedulers are well known components included in all multi-tasking computer systems since something must decide which of a plurality of active tasks is to be allowed to execute at any given moment. The invention may be used in conjunction with an existing scheduler, as long as this scheduler can be directed to deschedule a task on command, and will reschedule it either automatically, or again in response to a specific externally supplied command. Alternatively, the scheduler 860 may be custom-designed using known programming techniques to support the invention, along with the other customized features of the kernel 800.

In the discussion above of the embodiment of the invention illustrated in FIG. 3, the VMM 600, in particular, the binary translator 612, handles the task of detecting the presence of an idle loop (or analogous idling routine) in the guest system. When actual idling is detected as having gone on long enough to trigger descheduling, then the scheduler 860 is invoked to handle the actual descheduling operation. Thus, the functions of detection and de- and re-scheduling are handled by different components, at least in the illustrated embodiment. The software components that perform these functions may, however, be combined or co-located (for example, with both being in a host operating system kernel as either a single or as separate routines), or they may be located in different software layers than those illustrated in FIG. 3.

A para-virtualized system offers one illustration of alternative component location: In such a system, the code responsible for detection of idling could be included in the kernel of the guest operating system 520. Upon detection of excessive idling, the guest OS could then call out to the scheduling component 860, which could be in an intermediate software layer such as a hypervisor, or in any other software layer that contains the scheduler.

Extensions

As stated, the identification of whether a VM is in a single incarnation of the idle loop or not is preferably based on time; thus, the parameter "spinning" is cleared if the VM does not re-enter the sequence within a certain time period, which can be defined and measured in different ways, such as physically, that is, clock time, or virtually, that is, within a certain number of processor cycles. It is possible to generalize this scheme to work in the presence of several spinning regions: The parameters "spinning" and "startTime" can then be kept for individual sequences based upon the EIP (instruction pointer) of the PAUSE instruction.

The invention may also be generalized to other architectures or to idle loops that do not contain the PAUSE instruction. The identification of the idle loop at runtime may be possible even in the absence of the PAUSE instruction. For example, statistical sampling can be used to trigger an alarm when the VM spends a significant percentage of its execution time in a fixed EIP range (or several ranges), since this will tend to indicate execution in some form of idle loop. The corresponding ranges can then be examined for the presence of instructions indicating idling using, for example, a LOCK prefix or XCHG instruction, which are associated with atomic memory accesses. The binary translator 612 can then retranslate the original atomic instruction by inserting the above sequence either before or after it. Persistent spinning will then trigger a descheduling event.

As still another alternative, in systems with open-source operating systems, the idle loop can be detected by pattern matching and then be retranslated with the above descheduling code sequence whether it has a PAUSE instruction or not. Thus, as long as the sequence(s) of instructions that indicates idling is known, the binary translator, or any other software module that is able to observe the guest instruction stream, whether it then translates it or not, could simply look for this sequence to occur and trigger emission of the code block above if the idling pattern is found.

What is claimed is:

1. A method of scheduling virtual machines running on at least one processor, comprising:
    receiving instructions of a virtual machine for binary translation at a binary translation layer, the binary translation layer generating an outgoing stream of instructions for execution on the at least one processor;
    detecting instructions forming an idling loop in the received instructions; and inserting instructions in the outgoing stream of instructions for descheduling the virtual machine based upon detection of the instructions forming the idling loop, wherein the instructions inserted include a descheduling code block which when executed by said at least one processor measures how long the idling loop has been executed and deschedules the virtual machine if the execution time of the idling loop is longer than a threshold period.

2. A method as in claim 1, further including adjusting the threshold period based on a workload on said at least one processor.

3. A method as in claim 1, wherein said detecting includes measuring a frequency at which instructions received for binary translation are within a fixed instruction address range, and wherein the instructions for descheduling the virtual machine are inserted if the frequency exceeds a threshold frequency.

4. A method as in claim 1, wherein said detecting includes:
sampling the instructions received for binary translation;
measuring a frequency at which the sampled instructions are within a fixed instruction address range, and
determining that the instructions forming the idling loop have been detected when the frequency exceeds a threshold frequency.

5. A method as in claim 1, wherein said detecting includes determining that a sequence of a plurality of instructions issued by the virtual machine pattern-match an idling pattern.

6. A method as in claim 1, wherein said detecting and said descheduling are carried out by a software layer that is between the virtual machines and a host hardware platform for the virtual machines.

7. A method as in claim 6, wherein the software layer comprises a virtual machine monitor.

8. A method as in claim 1, wherein said detecting includes identifying a characteristic instruction in the idling loop, the characteristic instruction being an instruction that is indicative of idling loops.

9. A method as in claim 8, wherein the characteristic instruction is a PAUSE instruction.

10. A method as in claim 8, wherein the characteristic instruction is an instruction associated with atomic memory accesses.

11. A method as in claim 1, wherein the instructions forming the idling loop are executed by a guest operating system of said virtual machine.

12. A method as in claim 8, further including:
if the characteristic instruction is not detected within a predetermined interval after identifying the characteristic instruction for a first time then clearing a status associated with having detected for the first time the characteristic instruction.

13. A method as in claim 1, wherein descheduling the virtual machine further includes:
assigning a processor where the virtual machine is running to a different virtual machine; and
scheduling the virtual machine after a descheduling interval period has finished.

14. A method of scheduling virtual machines running on at least one processor, comprising:
converting at least some instructions issued by a virtual machine using binary translation into respective translated instruction streams for execution on said at least one processor;
detecting instructions forming an idling loop in the virtual machine based on said at least some instructions;
determining a threshold period based on a workload of said at least one processor; and emitting a descheduling code block as the translated instruction stream for at least one of said at least some instructions when the instructions forming the idling loop are detected, wherein the descheduling code block which when executed by said at least one processor performs operations of,
measuring how long the idling loop has been executed, and descheduling the virtual machine if the instructions forming the idling loop are detected after the threshold period.

15. A method as in claim 14, wherein the descheduling code block further performs a pause instruction every time the instructions forming the idling loop are detected within the threshold period.

16. A method as in claim 14, wherein a first time the instructions forming an idling loop are detected the descheduling code block when executed by said at least one processor performs operations of:
starting a timer for measuring how long the idling loop has been executed, and setting a flag that indicates a spinning state.

17. A computer system comprising:
a host hardware platform, which includes at least one hardware processor;
at least one virtual machine running on the host platform by issuing instructions for execution on said at least one hardware processor, the virtual machine including at least one virtual processor and a guest operating system;
a system software layer mediating access by the virtual machine for hardware resources, including said at least one hardware processor;
a software interface layer operable to observe the instructions issued by said at least one virtual machine to be executed on said at least one hardware processor;
a binary translation sub-system within the software interface layer converting at least some of the instructions issued by said at least one virtual machine using binary translation into respective translated instruction streams for execution on said at least one hardware processor;
a detection software module comprising computer-executable code for detecting instructions forming an idling loop within the issued instructions by the virtual machine; and
a scheduling software module within the system software layer comprising computer-executable code for descheduling the virtual machine;
in which:
the detection software module is incorporated into the binary translator and is further provided for emitting a descheduling code block as the translated instruction stream for at least one of the instructions issued by said at least one virtual machine, wherein the descheduling code block comprises computer-executable code for measuring how long the idling loop has been executed, and indicating descheduling to the scheduling software module if the execution time of the idling loop is longer than a threshold period.

18. A computer-readable storage medium containing a set of instructions that causes a computer system to perform a method of scheduling virtual machines running on at least one processor, said method comprising:
receiving instructions of a virtual machine for binary translation at a binary translation layer, the binary translation layer generating an outgoing stream of instructions for execution on the at least one processor;
detecting instructions forming an idling loop in the received instructions; and inserting instructions in the outgoing stream of instructions for descheduling the virtual machine at the instructions forming the idling loop, wherein the instructions inserted in the outgoing stream of instructions measure how long the idling loop has been executed, and deschedule the virtual machine if the execution time of the idling loop is longer than a threshold period.

19. A computer-readable storage medium containing a set of instructions as in claim 18, wherein said method further includes adjusting the threshold period as a function of workload on said at least one processor.

20. A computer-readable storage medium containing a set of instructions as in claim 18, wherein said detecting includes measuring a frequency at which instructions received for binary translation are within a fixed instruction address range, and wherein the instructions for descheduling the virtual machine are inserted if the frequency exceeds a threshold frequency.

21. A computer-readable storage medium containing a set of instructions as in claim 18, wherein said detecting includes:
    sampling the instructions received for binary translation;
    measuring a frequency at which the sampled instructions are within a fixed instruction address range, and
    determining that the instructions forming the idling loop have been detected when the frequency exceeds a threshold frequency.

22. A computer-readable storage medium containing a set of instructions as in claim 18, wherein said detecting includes determining that a sequence of a plurality of instructions issued by the virtual machine pattern-match an idling pattern.

23. A computer-readable storage medium containing a set of instructions as in claim 18, further including:
    wherein the instructions inserted include a descheduling code block which when executed by said at least one processor measures how long the idling loop has been executed and deschedules the virtual machine if the execution time of the idling loop is longer than a threshold period.

24. A computer-readable storage medium containing a set of instructions as in claim 18, wherein said detecting includes identifying a characteristic instruction in the idling loop, the characteristic instruction being an instruction that is indicative of idling loops.

25. A computer-readable storage medium containing a set of instructions as in claim 24, wherein the characteristic instruction is a PAUSE instruction.

26. A computer-readable storage medium containing a set of instructions as in claim 24, wherein the characteristic instruction is an instruction associated with atomic memory accesses.

27. A computer-readable storage medium containing a set of instructions as in claim 18, wherein the instructions forming the idling loop are executed by a guest operating system of said virtual machine.

* * * * *